United States Patent [19]

Abdel-Latif

[11] Patent Number: 5,310,422
[45] Date of Patent: May 10, 1994

[54] HIGH TEMPERATURE INORGANIC PAINT

[75] Inventor: A. Ismail Abdel-Latif, Chadds Ford, Pa.

[73] Assignee: General Electric Co., East Windsor, N.J.

[21] Appl. No.: 983,780

[22] Filed: Dec. 1, 1992

[51] Int. Cl.$^5$ .......................... C09D 1/02; C09D 5/24; C09D 5/33

[52] U.S. Cl. .................................... 106/635; 106/430; 106/444; 106/439; 106/903; 106/286.1; 252/500

[58] Field of Search ............... 106/605, 635, 400, 436, 106/444, 439, 449, 902, 903, 286.1, 286.6, 286.8; 252/62, 501.1, 500

[56] References Cited

U.S. PATENT DOCUMENTS

| | | | |
|---|---|---|---|
| 2,998,328 | 8/1961 | Munger et al. | 106/635 |
| 3,222,197 | 12/1965 | Sibert et al. | 106/635 |
| 4,173,485 | 11/1979 | Woditsch et al. | 106/449 |
| 5,066,330 | 11/1991 | Holcombe, Jr. et al. | 106/286.34 |
| 5,164,003 | 11/1992 | Bosco et al. | 106/605 |

OTHER PUBLICATIONS

"Application of a New Detector For Cathodeluminescense Measurement in the Wavelength Range to 1.8 mu M", by Koschek et al, published at pp. 199–204 of the journal Scanning, vol. 7, No. 4, 1985 (W. Germ.).

"Asymmetric Transmission Through a Photorefractive Crystal of Barium Titanate" by McDonald et al., published by pp. 146–150 of vol. 50, No. 3 of Optics Communications, Jun. 1, 1984 (Netherlands).

"High Luminous Efficiency Thin-Film Electroluminescent Devices with Low Resistivity Insulating Materials", by Hsu et al., published at pp. 1509–1512 of vol. 71, No. 3 of the Journal of Applied Physics, Feb. 1, 1992 (USA).

Primary Examiner—Mark L. Bell
Assistant Examiner—Michael Marcheschi
Attorney, Agent, or Firm—W. H. Meise; C. A. Berard; S. A. Young

[57] ABSTRACT

An inorganic paint suitable for harsh environments, and particularly suitable as a thermal control coating for spacecraft, includes a mixture of 50% or more dry weight barium titanate ($BaTiO_3$) pigment powder with a binder of an alkali metal silicate such as potassium silicate $K_2SiO_3$ or sodium silicate $Na_2SiO_3$. Instead of alkali metal silicate binder, a glass frit may be used, which when fused binds the pigment to the substrate. The coefficient of thermal expansion of the pigment is about $12 \times 10^{-6}/°C$. The coefficient of thermal expansion of the paint is moved toward the coefficient of expansion of the substrate by addition of a filler consisting of magnesia to increase the paint's coefficient of expansion, or alumina and/or silica to decrease the paint's coefficient of expansion. The paint survives harsh environments, ultraviolet radiation and a fluence of charged particles, while maintaining a low solar absorptance and high thermal emittance. Ceria may be added to the paint to reduce formation of color centers. The paint may be extruded onto a vaporizable transfer medium to form a tape.

12 Claims, 3 Drawing Sheets

HIGH TEMPERATURE INORGANIC PAINT

This invention relates generally to protective paints, and more generally to paints which are durable in the presence of solar radiation and a flux of charged particles, which withstand temperature extremes without degradation and which have high solar reflectivity and thermal emittance. Such paints are particularly useful in harsh environments and for spacecraft applications.

Thermal control surfaces are used to aid in controlling spacecraft temperatures. In general, such surfaces are required to reflect visible solar radiation (have low solar absorptance), and to radiate or emit heat energy as a function of the temperature of the surface (high emittance). In addition, the surfaces are required to withstand ultraviolet radiation and a fluence of charged particles such as electrons and protons in a vacuum environment. The surface may be exposed to atomic oxygen when in a low earth orbit. Also, the thermal surface must not be degraded by the high humidity of tropical launch sites, or by the vibration associated with spacecraft launch.

Optical solar reflectors (OSRs) are commonly used to provide a thermal control surface for spacecraft. An OSR is a small, generally rectangular, glass tile, about one by two inches, which is adhesively affixed to a substrate. Many such tiles are used in an array to cover large surfaces. A space is provided between adjacent OSRs to prevent cracking due to differential thermal expansion. Each OSR may have a transparent, electrically conductive outer coating of a substance such as indium-tin oxide (ITO) to render the outer surface conductive and thereby prevent localized buildup of electrical charge which might arc through the glass OSR. An electrically conductive path, such as a conductive epoxy, connects the edge of each OSR to the substrate or to the adjacent OSR to bleed off any charge. The spaces between OSRs, therefore, may not be suitably reflective and emissive, which reduces the overall effectiveness of the OSR tile surface. The OSR tiles are expensive, and require large amounts of labor for their application. Changes to the spacecraft cannot be readily made after the OSRs are applied, and any such change, or any incidental damage, is expensive to implement or repair.

FIG. 1 plots solar absorptance (integrated over a band of wavelengths extending from 300 to 2200 nanometers) versus equivalent solar hours (ESH) for some prior art thermal coatings. An equivalent solar hour represents a test condition equivalent to continuous exposure for one hour to Sun's ultraviolet radiation. In FIG. 1, plots 1, 2 and 3 represent the performance of three different paint coatings currently commercially available for use for thermal control in spacecraft-type applications. As illustrated, the initial solar absorptance is in the range of 0.2 to 0.25, and initially degrades rapidly.

Copending patent application Ser. No. 07/623,144, filed Dec. 5, 1990 now U.S. Pat. No. 5,215,824 in the name of Munro et al, describes a thermal blanket using a white silicone paint on an aramid sheet. The paint is protected from ultraviolet radiation and from charged particles by an outer aramid sheet. The white paint is an effective reflector of visible radiation. This arrangement is less costly than OSRs, but requires fastening of a plurality of sheets of aramid material to the spacecraft. For those situations in which spacecraft heat-generating equipment, such as payload electrical apparatus, is heat-sunk to an outer panel of the spacecraft, the Munro et al arrangement may not be as desirable as an OSR surface, because the paint-coated aramid sheet may not make good thermal contact with the panel, and the panel temperature may undesirably rise because it cannot rid itself of heat. Even if the panel made good thermal contact with the sheet, the white silicone paint may not be as emissive as desired.

An improved thermal control surface is desired.

SUMMARY OF THE INVENTION

An inorganic paint for harsh environments, such as for spacecraft thermal coating, includes 50% or more by dry weight of barium titanate pigment and 5% or more of a binder. The binder may be an alkali metal silicate or a glass frit. The alkali metal silicate binder may be one of potassium, sodium or lithium silicate. In particular embodiments of the invention, a filler material, which may be one of magnesia, alumina and silica, is added in an amount selected to improve the match of the coefficient of thermal expansion (CTE) of the paint to that of the substrate material. A spacecraft is coated with a paint according to the invention, in which the coefficient of thermal expansion of the paint is selected to match the average coefficient of expansion of the substrate over a temperature range of about zero degrees to 1000 degrees Celsius.

DESCRIPTION OF THE INVENTION

Figure 2:
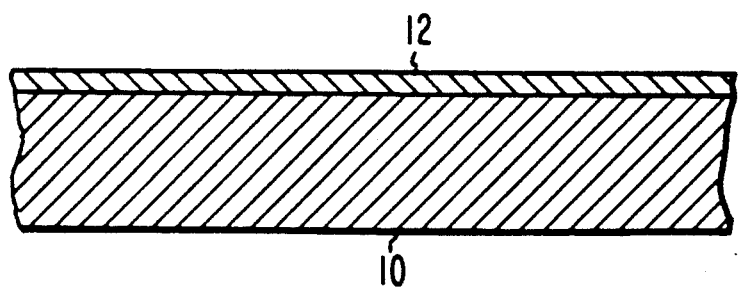
FIG. 2 illustrates a cross-section of a portion of a spacecraft panel coated with a layer of paint in accordance with the invention.

In FIG. 2, a portion 10 of a spacecraft panel is coated on its space-facing side with a layer 12 of paint according to the invention. As known, panel or substrate 10 may be an aluminum sheet, an aluminum face-sheet supported by an aluminum honeycomb, or it may be a graphite-fiber reinforced resin. Other materials, such as titanium 75A, titanium-15-3-3-3 alloy, stainless steel (300 series), carbon-carbon composite, molybdenum or niobium may be used as a substrate. Titanium 75A is ultra-pure (>99%) Ti, and titanium 15-3-3-3 is an alloy of titanium (Ti) With vanadium (V), chromium (Cr), tin (Sn) and aluminum (Al), respectively. The thickness of layer 12 of paint in FIG. I is desirably in the range of 1 to 12 mils (0.05 mm to 0.6 mm), but other thicknesses may be used.

Figure 1:
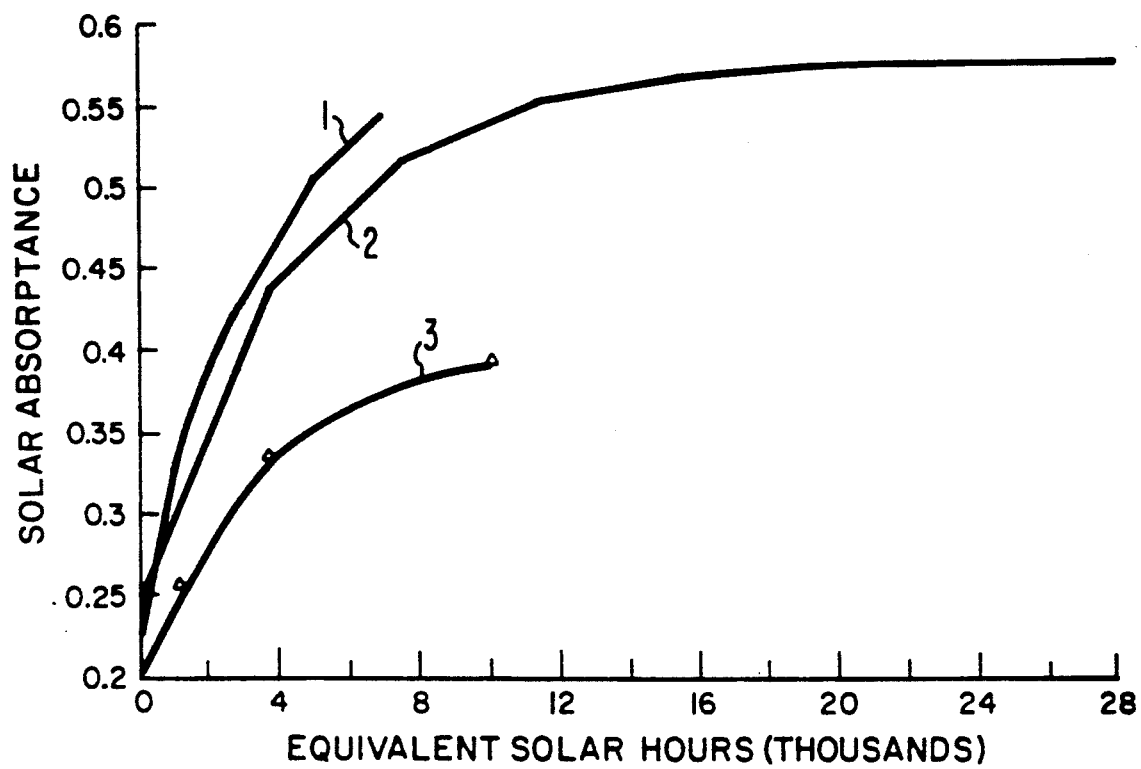
FIG. 1, is a plot of solar absorptance as a function of equivalent solar hours for prior art coatings, showing undesired rapid initial degradation with time, as an increase in solar absorptance.

In accordance with an aspect of the invention, layer 12 of paint, when dry, is a mixture which includes 50% or more by dry weight (wt.) of barium titanate ($BaTiO_3$) as a reflective pigment, and 5% or more by dry weight of a binder of an alkali metal silicate, where the alkali metal may be lithium, potassium or sodium. The silicate binder is therefore one of $Li_2SiO_3$, $Na_2SiO_3$, and $K_2SiO_3$. The powdered dry materials are mixed with a carrier material, which may be water, ($H_2O$) to make a solution or suspension of a viscosity which may be applied to substrate 10 of FIG. 1 with a brush, or which may be sprayed on. The paint is dried by allowing the water to evaporate, and heat may be applied to speed the drying process.

Another binder which has been found to be effective for painting aluminum with barium titanate is high quality, low melting temperature glass frit or powder. A suitable glass frit is type EG3607VEG or 3608VEG, available from Ferro Corporation at 4150 East 56th Street, Cleveland, Ohio 44105. Another glass frit suitable for aluminum is Con-2, a product of Innotech Corp., Trumbull, Conn. The glass frit is mixed with dry barium titanate pigment, and applied to the surface to be painted. The temperature of the paint and substrate are then raised to a level sufficient to fuse the glass frit, whereby it adheres to the aluminum and to other particles of frit, thereby binding the pigment. Glass frit TM-5, EE-2 and EE-10 produced by Sem-Com Corp. of Toledo, Ohio, match the coefficient of thermal expansion of titanium, molybdenum, respectively, and are useful for reasons described below.

A particularly advantageous method for applying the barium titanate/glass frit paint to the surface to be painted is to mix dry barium titanate powder with glass frit, and add sufficient water and/or pine oil (type ESL #414 and compatible diluent type ESL #401, produced by Electro-Science Labs, King of Prussia, Pa. 19406) to make a workable consistency. The mix is then extruded in a thin, uniform layer onto a flexible support surface such as a thin acetate ("CELLOPHANE") sheet to which the wet paint adheres to form a tape of paint. The paint may be allowed to dry partially or entirely. The support sheet is inverted over the surface to be painted, so the paint is adjacent to the surface, and the paint is then applied to the surface in the regions to be painted. The temperature is raised to a temperature sufficient to fuse the frit. The support sheet may be peeled off the outer surface of the fused paint, or the temperature may be maintained for a time sufficient to vaporize the support sheet. The coefficient of thermal expansion of the Ferro Corporation glass frit is about $19 \times 10^{-6}/°$ C.

The described barium titanate/binder paints, and the application processes, are relatively inexpensive. The characteristics of the paint are maintained in a fluence of ultraviolet and charged particles, and the reflectance and emittance are satisfactory for temperature control.

Figure 5:
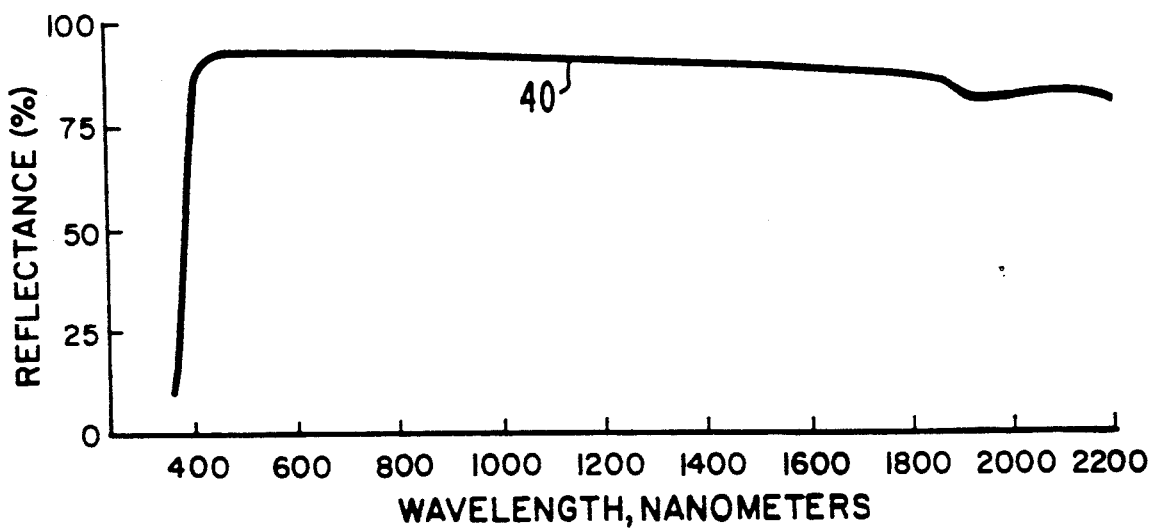
FIG. 5 plots reflectance of a very thin coating of a barium titanate paint in accordance with the invention, as a function of wavelength.

Plot 40 of FIG. 5 represents reflectance of a barium titanate pigment paint as a function of wavelength.

It has been found that the intrinsic electrical conductivity of the cured barium titanate/alkali metal binder paint is about $10^6$ or $10^7$ ohms/square, which is sufficient to allow movement of electrical charge. Thus, there is no need for a separate step after the step of painting, by which an electrically conductive coating is applied to the outer surface. Since the conductivity is a bulk characteristic rather than a surface characteristic of the paint, charge can bleed through the paint from the outer surface to the underlying substrate. This avoids the need for yet another step of providing a ground connection between the substrate and the conductive surface.

When substrate 10 is an aluminum sheet or an aluminum sheet with an aluminum honeycomb support, the paint may have dry weight percentages of barium titanate 70% to 90%, potassium silicate 5% to 20%, and an added filler of magnesia, alumina or silica for the remainder, for reasons described below. These materials are desirably as pure as possible, to prevent darkening of the surface due to color center formation attributable to the action of ultraviolet radiation and charged particles on undesired contaminants. A suitable barium titanate material is TICON HPB high purity material, manufactured by TAM Ceramics, whose address is Box C, Bridge Station, Niagara Falls, N.Y. 14305, which has a particle size distribution in which about 40% of the cumulative mass is composed of particles having equivalent spherical diameter under one micrometer ($\mu$m), and 100% under 5$\mu$m. Suitable potassium silicate binders are Kasil 2130 or 2135, manufactured by Philadelphia Quartz Co., whose address is P.O. Box 840, Valley Forge, Pa. 19482. As supplied, the Kasil binders are dissolved in water. Kasil 2130 has a dry weight content of 35%. A sufficient quantity of deionized water is added to the composite paint mixture to achieve the proper viscosity for application. The paint is allowed to dry after application to the surface, for seven days at room temperature, and it becomes tack free within a few hours, and handleable within two days maximum.

According to another aspect of the invention, the paint includes a filler material, the coefficient of thermal expansion (CTE) of which is selected to approximately match (or to at least improve the match of) the coefficient of thermal expansion of the dried paint to the coefficient of thermal expansion of the substrate to which it is applied. The filler material is selected to be one of magnesia ($M_gO$), alumina ($Al_2O_3$), and silicon dioxide ($SiO_2$), or a mixture thereof.

Figure 3:
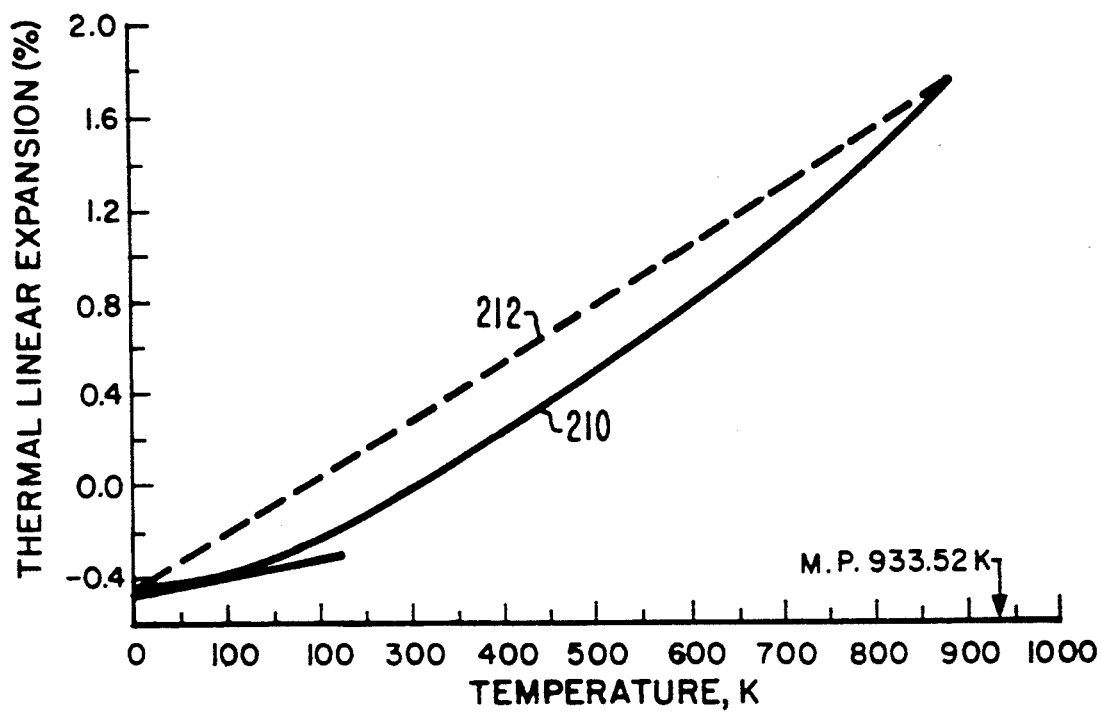
FIG. 3 plots the coefficient of thermal expansion of aluminum over a range of temperatures.

According to another aspect of the invention, the coefficient of expansion of the paint is matched to the average coefficient of expansion of the substrate material over a temperature range of 20° Celsius (C.) (293° K) to at least 600° C. (873° K) and preferably 1000° C. (1293° K). In some cases, the substrate material will have a lower temperature limit, e.g. aluminum melts at about 660° C. (933° K). FIG. 3 plots the coefficient of thermal expansion of aluminum −6061 over a temperature range of 0° K to 900° K. As illustrated by plot 210 in FIG. 2, the coefficient of expansion (the slope of a tangent to plot 210) varies over the temperature range. This is believed to be due to changes of phase and/or crystalline structure at various temperatures. Plot 212 represents the average coefficient of expansion over the complete temperature range (0° to 933° K). If the paint were to be matched to the room-temperature (ambient) coefficient of expansion of the aluminum substrate, represented by dash line 214 in FIG. 2, the resulting paint would have a coefficient of expansion much less than the average over the entire temperature range. Such a paint would have a tendency to chip or crack at temperature extremes, due to differential expansion. Some of the paint formulations according to the invention, with matching (or at least improvement of match) to the average coefficient of thermal expansion of the substrate over the temperature range of 0° C. to 1000° C., have been subjected to a temperature range extending from that of liquid nitrogen to about 1000° C., without cracking. It should be noted that the coefficient of thermal expansion of aluminum metal at room temperatures is close to the maximum coefficient of thermal expansion of the magnesia-filled barium titanate/potassium silicate paint.

A particular paint had 80% by weight (wt) barium titanate, 10% wt potassium silicate, and 10% wt alumina. This paint was successfully tested on titanium and stainless steel substrates without any degradation in its optical and/or mechanical properties, such as adhesion, after vacuum thermal cycling ($-100°$ C. to $+200°$ C.), humidity (98% r.h. at 48° C. for about 48 hours), and thermal shock (liquid nitrogen immersion and a rapid temperature rise to 1000° C. (within 30 seconds) tests.

Suitable performance has been achieved using one-micron 99.98% pure alumina from A. Meller Optics Co. (P. O. Box 6007, Providence, R.I. 02940), and such alumina is also available from Norton Co. of Worcester, Mass. 01606. Magnesia of 99.999% purity, and 99.99% pure silica are available from AESAR, a Johnson-Mathey Co., Seabrook, N.H. 03874. Magnesia with 99.5% of the particles with a size less than 20 micrometers is available from Fisher Co., Fair Lawn, N.J. 07410.

The coefficient of thermal expansion of MgO is $15.6 \times 10^{-6}/°$ C. over the temperature range of 20° to 1000° C., its melting point (M.P.) is 2800° C., and its relative density is 3.58. The coefficient of expansion of $Al_2O_3$ is $9.8 \times 10^{-6}/°$ C. over the same temperature range, M.P. is 2046° C., and density is 3.97. For $SiO_2$, coefficient of expansion is $0.5 \times 10^{-6}/°$ C., M.P. is 1720° C., and density is 2.2. In general, the magnesia filler material is used to increase the coefficient of expansion of the composite paint, and the alumina and especially the silica fillers are used to reduce the coefficient of expansion.

The coefficient of expansion of barium titanate is $12 \times 10^6/°$ C. If the binder content of the basic pigment-plus-binder paint is low, its coefficient of thermal expansion will be dominated by the coefficient of thermal expansion of the barium titanate, as described below in conjunction with the Turner equation. Therefore, to match the coefficient of thermal expansion of the basic paint plus filler to the coefficient of thermal expansion of aluminum 6061, for example, which has a coefficient of expansion of $28 \times 10^{-6}/°$ C., that one of the fillers alumina, magnesia and silica is selected which has the greatest coefficient of expansion, namely magnesia. Of course, the addition of magnesia can only move the coefficient of expansion of the paint toward $15.6 \times 10^{-6}/°$ C., and cannot actually reach $28 \times 10^6/°$ C. to thereby precisely match the 0° C. to 600° C. expansion of aluminum. Other substrate materials, however, can actually be matched. For example, a titanium (Ti) substrate has a coefficient of expansion of $11.8 \times 10^{-6}/°$ C., which can be matched by a paint containing about 80% by dry weight barium titanate, 10% dry weight alumina, and 10% potassium silicate. This formulation might be, for example, 80 gms. of TICON HPB, mixed with 10 gms. $Al_2O_3$, 34 gms. of Kasil 2130 solution, and 26 gms. $H_2O$, which together represents about 150 gms. liquid and 100 gms. solids.

Figure 4:
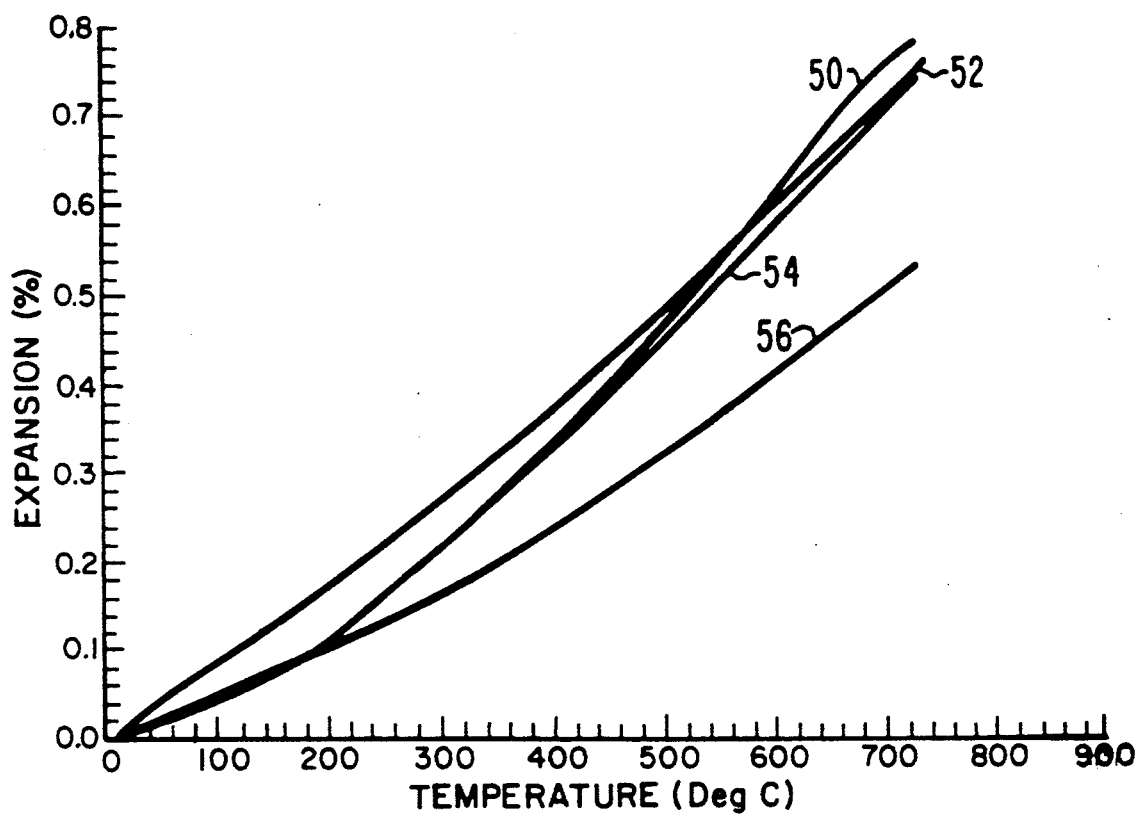
FIG. 4 plots measured coefficient of thermal expansion of pure barium titanate, cured paint according to the invention, a titanium alloy substrate, and aluminum oxide.

FIG. 4 illustrates percentage coefficient of thermal expansion versus temperature in degrees Celsius. Plot 50 represents pure barium titanate, 52 represents Ti-15V-3Al-3Cn-3Sn substrate, 54 represents the above-mentioned 80/10/10 cured paint, and 56 represents pure aluminum oxide. Over the 0° to 740° K temperature range, the cured paint matches the titanium alloy substrate well.

Other substrate materials, such as molybdenum (Mo), coefficient of expansion $6.95 \times 10^{-6}/°$ C. and niobium (Nb), coefficient of expansion $9.00 \times 10^{-6}/°$ C., can be matched in a similar manner. The Turner equation may be used to calculate the appropriate amounts of each ingredient, as described below.

The Turner equation estimates the coefficient of thermal expansion $\alpha_c$ of a multiphase system.

$$\alpha_c = \frac{(\alpha_1 K_1 F_1)/P_1 + (\alpha_2 K_2 F_2)/P_2 + \ldots + (\alpha_i K_i F_i)/P_i}{K_1 F_1/P_1 + K_2 F_2/P_2 + \ldots + K_i F_i/P_i} \quad (1)$$

Where:
$\alpha_c$ = the CTE to be determined;
$\alpha_i$ = coefficient of volume expansion for each phase or component;
$\kappa_i$ = bulk modulus (the force per unit area required to break the material) of each phase;
$F_i$ = weight fraction of each phase;
$P_i$ = density (weight or mass per unit volume) of each phase.

It has been discovered that the effect of the bulk modulus on the Turner equation is small. Neglecting the bulk modulus, the Turner equation becomes $$\alpha_c = \frac{(\alpha_1 F_1)/P_1 + (\alpha_2 F_2)/P_2 + \ldots + (\alpha_i F_i)/P_i}{F_1/P_1 + F_2/P_2 + \ldots + F_i/P_i} \quad (2)$$

Equation (2) is simple and easily used. The formulation of the paint illustrated by plot 54 of FIG. 4 was initially determined by the Turner equation, and illustrates how well the use of the Turner equation to engineer or formulate a paint to match the thermal expansion of a specific substrate.

The substrate may be prepared to receive the paint by sandblasting the surface using 100-grit or finer particle silicon carbide abrasive, followed by ultrasonic cleaning for five minutes in acetone or isopropyl alcohol. The surface is then rinsed with distilled deionized water and dried. Metal foil substrates such as titanium or stainless steel may be damaged by sandblasting, so an etching step may be substituted. The etching is performed for a few seconds in a solution of 85% by volume water ($H_2O$), 10% by volume hydrofluoric acid (HF), and 5% by volume nitric acid ($HNO_3$), followed by the above-mentioned cleaning steps.

Standard ASTM adhesion tests (D-3359) were conducted on several samples in accordance with the invention, both before and after environmental tests were performed, to detect any degradation. The maximum upper test temperature was established by using a focused IR lamp that heated the paint samples to about 1000° C. within a few seconds, and the test lasted two minutes. No visible degradation was observed upon examination under ordinary and scanning electron microscopes.

The 80 wt % pigment, 10 wt % alumina, 10 wt % Kasil binder paint was applied to substrates of aluminum, anodized aluminum, pure titanium 75A, titanium 15-3-3-3, stainless steel 302, graphite epoxy, and carbon-carbon composites, and were found to adhere well at room temperature. FIG. 5 illustrates that for such a coating applied as a very thin layer to a very thin (2 mil thick Ti foil) the integrated solar absorptance value (1-reflectance) is only 0.137. This value represents the integrated value of reflectance over the whole wavelength range of the spectrum shown in FIG. 5. While this paint composition does not match the CTE of all the substrates perfectly, it did not flake from the titanium, titanium alloy or stainless steel substrates from temperatures corresponding to liquid nitrogen up to +300° C. Unfilled paint (90% BaTiO$_3$,10% Ksio$_3$) was applied to both titanium and the stainless steel substrates, and also adhered well at room temperature.

Paint with 70% dry weight of barium titanate, 10% wt. potassium silicate, and 10% wt. of each of alumina and silica, was found to be effective for application to molybdenum or niobium substrates.

Another method for preparing the paint involves heating the paint during the mixing process. The dry barium titanate, the alkali metal silicate (preferably dry), and the fillers, if any, are mixed and placed in a crucible, and the temperature is raised sufficiently to melt the ingredients. The molten material is poured from the crucible into a mold, in which it freezes and solidifies. Some barium titanosilicate may be formed in the process. The frozen paint is crushed to form a crushed powder with a particle size of 1 to 10 microns, which may be stored for later use. The crushed powder is then mixed with water or other material to form a workable paint which may be applied to the surface to be painted.

When paint according to the invention is used in an environment in which it may be subjected to ultraviolet radiation, formation of color centers may be inhibited by addition of about 1% to 7% ceria (cerium oxide, CeO$_2$ and/or other lower oxides) powder, particle size 1 to 10 microns.

Other embodiments of the invention will be apparent to those skilled in the art. For example, a separate transparent conductive layer such as ITO may be applied to the paint, if desired.

What is claimed is:

1. A durable temperature resistant paint, comprising a mixture of:
   greater than 50% dry weight barium titanate pigment;
   greater than 5% dry weight of an alkali metal silicate binder; and
   sufficient water to allow said pigment and binder to be applied.

2. A paint according to claim 1, wherein said alkali metal silicate is potassium silicate.

3. A paint according to claim 1, further including a filler consisting of one of alumina, magnesia, and silica.

4. A paint according to claim 1 for use on a substrate having a particular coefficient of thermal expansion, said paint further including a filler of magnesia mixed with said paint when said particular coefficient of thermal expansion exceeds about $12 \times 10^{-6}/°$ C., and at least one of alumina and silica when said particular coefficient of thermal expansion is less than about $12 \times 10^{-6}/°$ C., to improve the match of said coefficient of thermal expansion of said paint to said particular coefficient of thermal expansion.

5. A paint according to claim 4 for use on an aluminum metal substrate having said particular coefficient of thermal expansion of about $28 \times 10^{-6}/°$ C., said paint having a dry weight percentage range of 70% to 90% of said barium titanate, a dry weight percentage range of 5% to 20% of said alkali metal silicate, and a dry weight percentage of 7 to 20% of a filler consisting of magnesia.

6. A paint according to claim 4 for use on a graphite-containing composite substrate, said paint having a dry weight percentage range greater than 50% of said barium titanate, a dry weight percentage range of 5 to 20% of said alkali metal silicate, and a filler consisting of a dry weight percentage of about 5 to 20% of alumina and a dry weight percentage of about 5 to 15% of silica.

7. A paint according to claim 4 for use on a stainless steel substrate, said paint having a dry weight percentage range of greater than 50% of said barium titanate, a dry weight percentage range of 5 to 20% of said alkali metal silicate, and a dry weight percentage of about 5 to 25% of a filler consisting of alumina.

8. A paint according to claim 4 for use on a titanium-based substrate, said paint having a dry weight percentage range of greater than 60% of said barium titanate, a dry weight percentage range of 5 to 20% of said alkali metal silicate, and a dry weight percentage of about 0 to 20% of an alumina filler.

9. A paint according to claim 4 for use on one of molybdenum and niobium, said paint having a dry weight percentage range of greater than 60% barium titanate, a dry weight percentage range of 5 to 20% of said alkali metal silicate, and a dry weight percentage of about 5 to 20% of an alumina filler, and 5 to 20% silica filler.

10. A paint according to claim 1, wherein said alkali metal silicate is lithium silicate.

11. A paint according to claim 1, wherein said alkali metal silicate is sodium silicate.

12. A paint according to claim 1, further comprising up to 7% ceria powder for improved protection of the paint from ultraviolet.

* * * * *